(12) United States Patent
Mitchell

(10) Patent No.: US 6,442,134 B1
(45) Date of Patent: Aug. 27, 2002

(54) ATM NETWORK WITH RING ARCHITECTURE

(75) Inventor: Charles Mitchell, Nepean (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/117,282
(22) PCT Filed: Jan. 27, 1997
(86) PCT No.: PCT/CA97/00052
§ 371 (c)(1), (2), (4) Date: Jan. 21, 1999
(87) PCT Pub. No.: WO97/27718
PCT Pub. Date: Jul. 31, 1997

(30) Foreign Application Priority Data

Jan. 27, 1996 (GB) .............................. 9601692

(51) Int. Cl.⁷ .................................. H04J 3/00
(52) U.S. Cl. ....................... 370/223; 370/258; 370/404; 370/406; 370/465; 370/907; 370/395.1
(58) Field of Search ................................ 370/216, 223, 370/224, 237, 242, 258, 351, 395, 396, 397, 399, 403, 404, 405, 406, 465, 468, 907, 221, 222, 395.2, 395.3, 401, 402, 395.1

(56) References Cited

U.S. PATENT DOCUMENTS 5,548,589 A * 8/1996 Jeon et al. ................... 370/399
5,701,416 A * 12/1997 Thorson et al. .............. 370/351
5,799,001 A * 8/1998 Lee et al. .................... 370/223
6,011,780 A * 1/2000 Vaman et al. ................ 370/237

* cited by examiner

Primary Examiner—Douglas Olms
Assistant Examiner—Shick Hom
(74) Attorney, Agent, or Firm—Marks & Clerk

(57) ABSTRACT

In a method of establishing communication over a network a number of nodes are interconnected in a ring architecture. Virtual connections are set up on a pair of counter-rotating packet-based rings to interconnect the nodes. At each node packets destined for that node are extracted from the rings, outgoing packets are added to the rings, and packets on each ring not destined for that each node pass directly through. This arrangement establishes a virtual mesh structure between the nodes. Either each node transmits packets on both rings or receives packets from both rings. In the case where each node transmits packets on both rings the node selects one of the rings from which to receive packets in the absence of a fault, selects the fault-free ring from which to receive packets if only one of the rings has a fault, and selects both rings from which to receive packets if both rings have faults. In the case where each node receives packets from both rings the node selects one of the rings on which to transmit packets dependent on the destination of the transmitted packets in the absence of a fault, and in the presence of a fault the node alters its transmitting behavior to broadcast packets on both rings.

15 Claims, 5 Drawing Sheets

DS = Diablo Switch
ECC = Egress Cell controller
ICC = Ingress Cell Controller

Simple UASR:
1) TX all traffic on both Rings
2) If no failure
    Rx all traffic from either
   If one Ring fails
    RX traffic from other Ring
   If both Rings fail*
    RX traffic from both Rings

*both directions of a span

ATM NETWORK WITH RING ARCHITECTURE

This invention relates to packet-based networks such as ATM (Asynchronous Transfer Mode) networks, having a ring architecture. The invention is applicable to both local and wide area networks.

There is a need within networks to ensure that network operation is not interrupted in the event of infrastructure failures, such as cable cuts and/or equipment failure. The current state of the art is to provide protection with SONET Ring architectures. Bellcore standard GR-1230-CORE describes a Bi-direction Line Switched Line Switched Ring and GR-1400-CORE describes a Uni-directional Path Switched Ring.

In the case of ATM networks, the current state of the art is to send ATM payloads over SONET ring structures. As this is an expensive solution, there is a need to provide a simpler mechanism for ATM network protection. While it is possible to map SONET Ring structures directly into an ATM implementation using the ATM Switch to perform the necessary bridging and re-configuration, the result is an inefficient use of the ATM Switch and a slow response time.

An object of the invention is to provide a wide area network architecture that alleviates the afore-mentioned problems of the prior art.

According to the present invention there is provided a communications network a communications network comprising a plurality of nodes interconnected in a ring architecture. A pair of counter-rotating packet-based rings interconnect the nodes to establish virtual connections therebetween. Each node includes a ring interface and a packet switch connected thereto. The ring interface comprises means for extracting packets from either ring destined for the packet switch, means for adding outgoing packets the packet switch to either ring, and means for passing directly through packets on each ring not destined for the node. This results in a virtual mesh structure being established between said nodes.

The rings can either be unidirectional or bi-directional. Of course, it will be understood by one skilled in the art that additional rings can be provided without detracting from the advantages offered by the invention.

The described ring structure allows bandwidth to be efficiently shared between the nodes on the ring without the wastage inherent in a hard-wired mesh and without using up valuable ATM switch resources since onward cells are passed directly through the interface without being forwarded to the ATM switch.

The invention also provides a method of establishing communication over a network wherein a plurality of nodes are interconnected in a ring architecture. A pair of counter-rotating packet-based rings are established to interconnect the nodes and provide virtual connections therebetween. At each node packets destined for the node are extracted from the rings, outgoing packets from the node are added to the rings, and packets on each ring not destined for that node are passed directly through. This results a virtual mesh structure being established between the nodes.

The invention will now be described in more detail, by way of example only, with reference to the accompanying drawings, in which:

FIG. 7b shows a portion of the ring shown in FIG. 7a;

Figure 1:
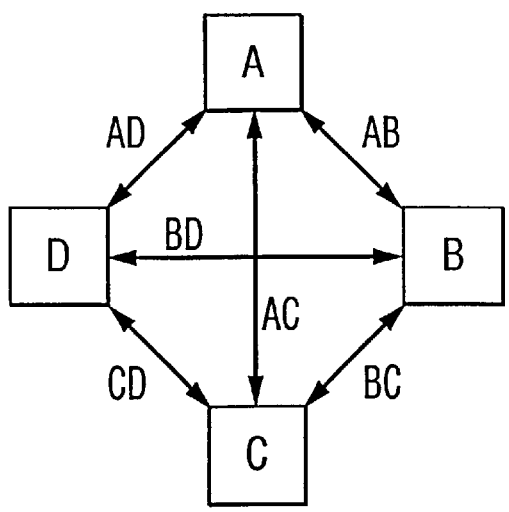
FIG. 1 shows a four node mesh network.

FIG. 1 shows a four-node mesh network forming a SONET ring. There are six possible bi-directional connections between the nodes. i.e. A-B, A-C, A-D, B-C, B-D and C-D. In a mesh network such as this, six point-to-point links are required to complete the mesh. If these links are OC-3c interfaces with approximately 150 Mbps capacity, since the bandwidth of these individual links is fixed, no advantage can be taken of the variable bandwidth demands of the nodes. If node A on average requires 50 Mbps to node B, 100 Mbps to node C and only 20 Mpbs to node D, the unused capacity to these links is wasted.

While it is possible to route traffic via alternative routes to try and make use of this bandwidth, this is a software intense task that requires extra CAC (Connection Admission Control) calculations and uses up valuable switch resources at these tandem nodes.

Figure 2:
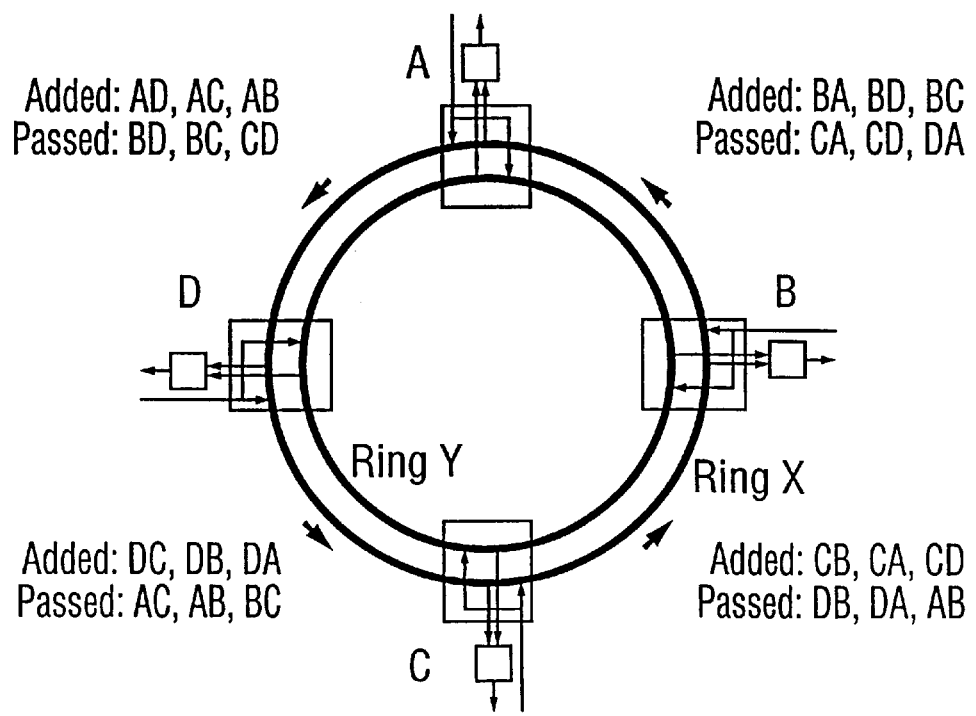
FIG. 2 shows a four node ring network.

In FIG. 2, the four nodes A, B, C, D are interconnected by an OC-12c ATM Ring. An OC-12c interface has four times the capacity of a OC-3c link, i.e. approx. 600 Mbps. In this case, each segment of the ring carries six virtual paths, resulting in a logical mesh, i.e. each node has a direct virtual path to every other node. The advantage of this arrangement is that all of the paths are carried on the one link. This means that the nodes using less bandwidth free up the capacity for other nodes to use, and when required nodes can use up to the full bandwidth of the Ring, i.e. node A can send a full 600 Mpbs to node C.

Two types of ATM ring can be used: a) A Uni-directional ATM Switched Ring (UASR), and b) A Bi-directional ATM Switched Ring (BASR).

In the UASR, the same traffic is transmitted in opposite directions on two counter-rotating Rings. At each node ingress ATM cells come in on a standard cell relay interface. Cells destined for that node are "dropped" into the switching fabric of the node while the remaining cells are queued with the cells to be "added" by that node and sent out the egress port of the standard cell relay interface.

Figure 3:
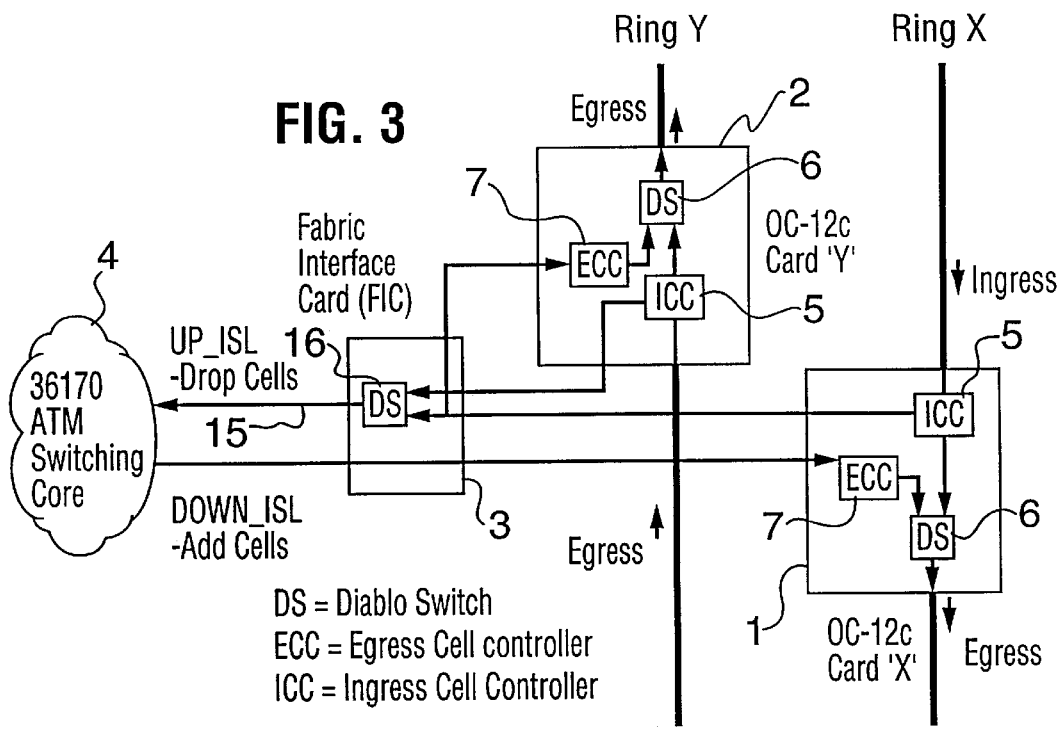
FIG. 3 shows a ring interface using OC-12c Interface Cards for a Newbridge Networks 36170 ATM switch.

FIG. 3 shows how this ring interface maps onto a Newbridge Networks Corporation 36170 OC-12c card at each node. Rings X and Y pass through OC-12c cards 1 and 2 respectively. These are connected through a Fabric Interface Card (FIC) 3 to a Newbridge Networks Corporation 36170 ATM switching Core 4. On the ingress side of each ring, the Ingress Cell Controller (ICC) 5 on the OC-12c card determines whether the incoming cells are to be dropped onto the UP_ISL by looking at the cell's VPI field. Each node on the ring is addressed with a range of VPI values. The Fabric Interface Card 3 receives drop traffic from each Ring and has the ability to select cells from either, or both Rings.

This ability is provided by, for example, Newbridge Networks Corporation Diablo ASIC 6, which is a two-input to one output cell switching engine. The inputs of the Diablo 6 are connected to the respective rings X,Y. The "through" cells are queued with cells to be added from the DOWN_ISL (Inter-Shelf Link), again using the Diablo switching ASIC 6 and Egress cell controller 7. Alternatively, all traffic from the ring can be brought up the UP_ISL to the switching core where the cells to be dropped are sent down to their appropriate ISL, and through cells are returned down the OC-12 cards DOWN_ISL along with cells to be added to the ring. In either case, an important feature is that traffic to be dropped at a node can be selected from either or both rings.

The rules for receiving data off the ring are quite different from a time division multiplex ring, such as a SONET ring, for example.

Figure 4:
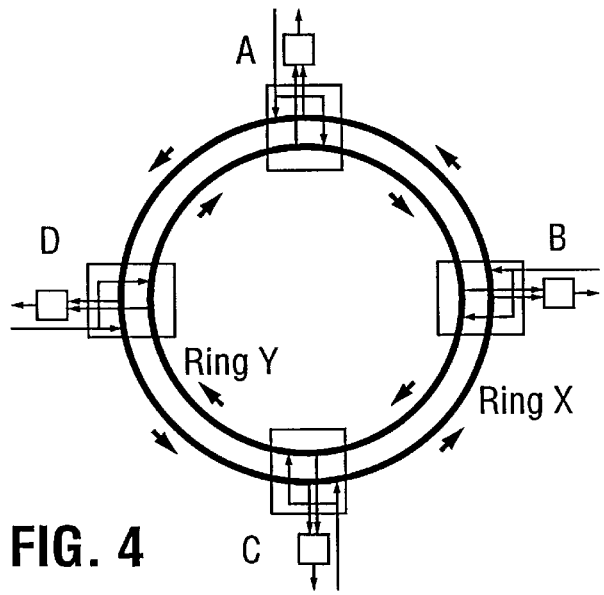
FIG. 4 shows a simple uni-directional ATM Switched Ring (UASR)

FIG. 4 shows a simple UASR. If both the X and Y rings are fault-free any node on the ring is free to receive data from either ring, i.e. the Diablo switch 6 on the FIC 3 selects only one of its inputs to switch directly to its output. If a fault occurs on one of the rings, then all nodes program the Diablo 6 to receive data off the other fault-free ring. If both rings have faults, then all nodes receive data from both rings by enabling both inputs to the Diablo 4.

The common cases are where both rings have faults, and the rings can recover fully, a cable cut on the span connecting two nodes, and a node going out of service. Other double faults can leave the ring operating in a diminished capacity.

It will be appreciated that with ATM data transmission, cells are only transmitted when there is data to send. Consequently, as long as the identical cells are not being received on the two rings, any ATM cell destined for a particular node can be received. In order to ensure that identical cells are not received at any node, it is important to ensure that when both rings have faults, any node that detects a fault on its incoming link squelch its corresponding counter-rotating link on the same span.

Figure 5:
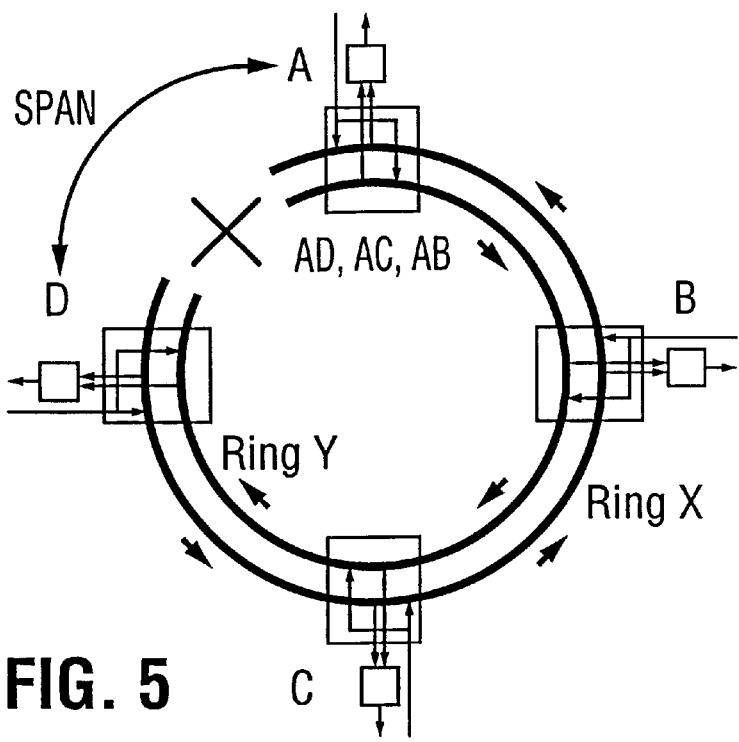
FIG. 5 shows an example of a double ring fault.

There are several cases of faults on both rings that need to be considered. The simplest and most common case is that of a cable cut in a span connecting two nodes in the Ring. FIG. 5 shows illustrates this case. In this case the nodes A, D surrounding the cut will detect the cut on the incoming ring and unnecessarily squelch the traffic in the counter rotating ring. Unnecessarily, in this case because the cell flow in the counter rotating direction could not have been received by any other node due to the cut.

Figure 6:
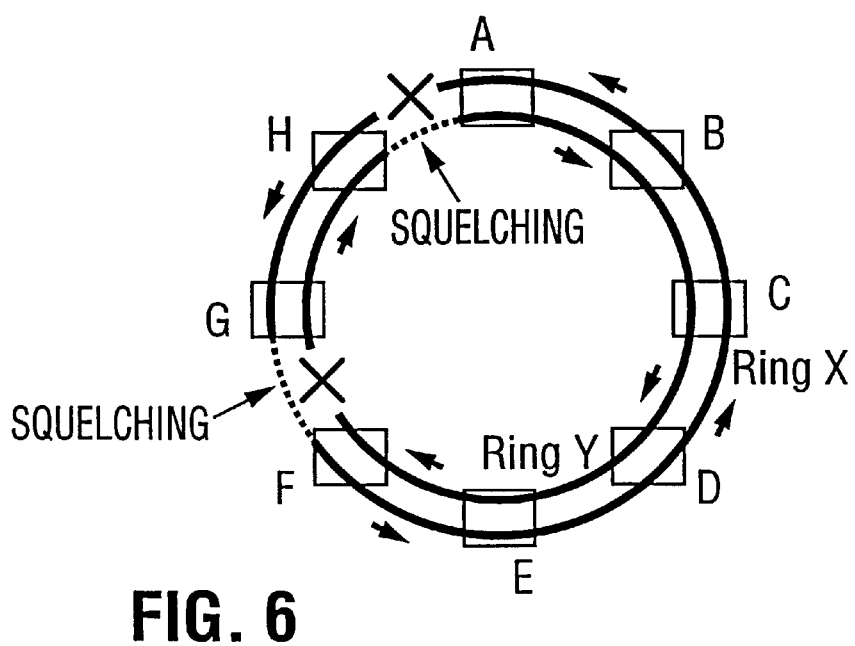
FIG. 6 shows another example of a double ring fault.

A more generalized case is shown in FIG. 6. In this case a double fault results in segregated islands of links. Each island is capable of full-duplex communication with other members in the island. For example in FIG. 6, nodes A through F will enjoy complete communication with each other. Note that if nodes G and H had not squelched their traffic, cells from G and H would be received twice at nodes A through F (in the double Ring fault case, all nodes receive cells from both Rings).

During normal operation, in-band ATM cells or part the SONET can be used to indicate to all nodes on the ring that the ring is fault. In the latter case, any node that has detected a fault on one of its incoming links sets an indication to the next node on the uni-directional ring. Any node receiving such and indication on its incoming link sets an indication to the next node on the uni-directional ring.

Figure 7A:
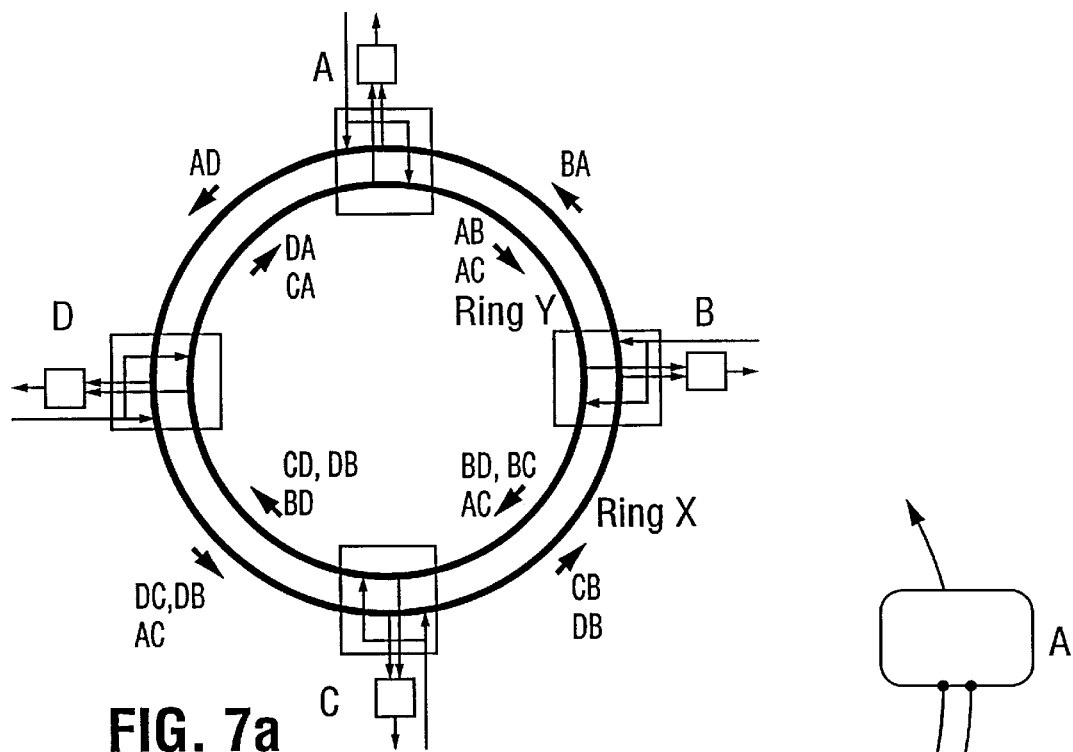
FIG. 7a shows a bi-directional ATM Switched Ring (BASR)
Figure 7B:
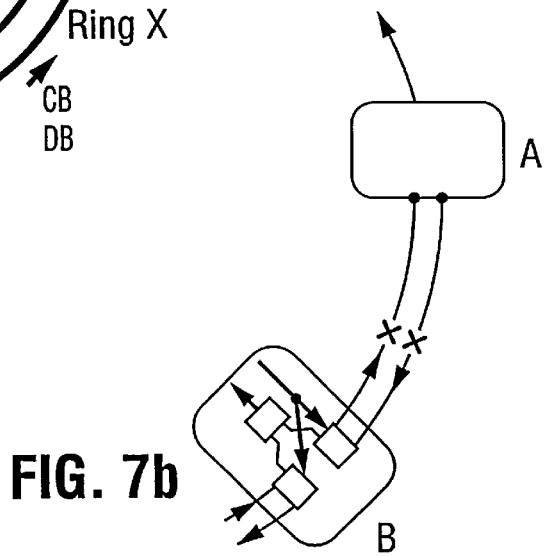

The bi-directional ATM Switched Ring (BASR) shown in FIGS. 7a and 7b is a further refinement of the ATM Ring concept where a small change in approach allows for the use of the "extra" bandwidth on the Ring. Extra bandwidth is freed up on the ring by not broadcasting the same cells on both Rings, but selectively sending Add cells on one of the two Rings. FIGS. 7a and 7b show how node A can transmit cells on the X Ring to node D and transmit cells on the Y Ring to nodes B and C. As a minimum, this results in less traffic on the rings and therefore less congestion at the queuing points. For this type of ring the receiving nodes are programmed to always receive cells from both rings. In the event of ring failures, it is the transmitting function that alters its behavior. Any ring failure will cause all nodes to change from transmitting selectively on a particular ring, to broadcasting all cells on both rings.

The examples discussed so far have been for OC-12c Rings. OC-12c rings map well into the Newbridge Networks Corporation's 36170ISL (Inter-Shelf Link) architecture. The particularly attractive feature is that the through traffic on the rings does not go into the switching core and that it takes only one ISL to support an OC-12c Ring.

There are two fundamentally different applications for OC-12c Rings. The first is the "backbone" application where OC-12c Rings are used to connect large switches to form a network backbone. The other is a "collector" application where many smaller nodes feed the ring with smaller bandwidths.

In the backbone case, the number of switches on a ring would normally be limited to four or five nodes. This limits the delay and CDV and it also justifies the size of the add and drop rates, i.e. ISLs (smaller add/drop rates would fall under the collector application).

Additional capacity is readily achieved by adding parallel rings. If the number of nodes on the backbone begins to exceed the optimum number, the parallel rings would be staggered to pick up different nodes.

The collector application by definition requires less add/drop bandwidth and generally picks up traffic from a larger number of smaller nodes. In this case the add/drop bandwidth need not be a full ISL. An OC-12c ring card can be made to fit in a UCS slot. This would allow even Standalone 36170 Shelves to be connect in a ring configuration. An application here may be pick up low bandwidth Frame Relay traffic onto a feeder ring (which would connect to a larger ATM backbone ring).

Transmitting selectively out the two OC-12c cards can be accomplished by:

1) a combination of programming the headers appropriately at all Ingress cards and programming the point-to-point filters to select one or both of the OC-12c card addresses, or 2) a hardware ECC function that identifies and enables/disables groups of connections. In this case Ingress connection programming would not change.

ATM Rings can also be made to work well using OC-3c interface cards. In this case, through traffic on the Ring would have to go through the switching core.

Transmitting out both OC-3c cards is readily accomplished by programming the point-to-point filters. Multicast is also easily handled by programming the same multicast groups.

Ingress selection of which Ring to listen to is accomplished by programming the Diablo switches 6 on the FICs 3 to select the appropriate Add bus (or both in the case of a Ring failure).

Transmitting selectively out the two OC-3c cards is accomplished by a combination of programming the Newbridge headers appropriately at all Ingress cards and programming the point-to-point filters to select one or both of the OC-3c card addresses.

Figure 9:
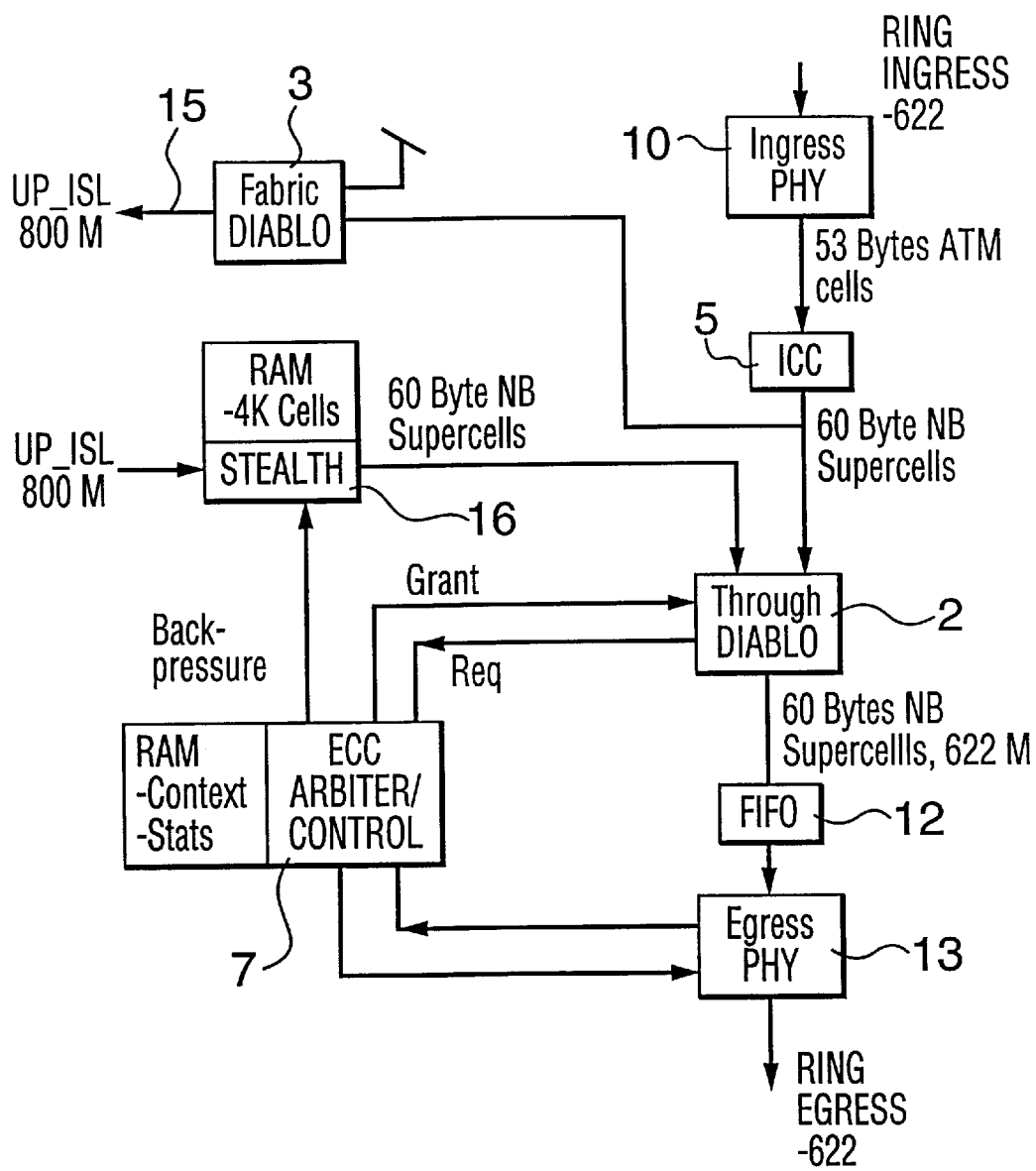
FIG. 9 is a block diagram of an OC-12c card.

FIG. 9 is a block more detailed diagram of an OC-12c card (1, 2) (FIG. 3). Cells coming off the ring pass through PHY unit 10 to ICC unit 5. Cells not destined for the node pass through diablo unit 1, FIFO 12 and egress PHY unit 13. Cells destined for the node are extracted by Diablo 3 and passed to UP_ISL link 15.

Cells from the node destined for the ring passes through stealth unit 16 to diablo unit 2. Egress cell controller 7 controls the adding of cells from the node to those passing through.

Given that there exists a significant installed base of SONET rings, it is also important that the ATM ring work well with existing SONET Rings.

Figure 8:
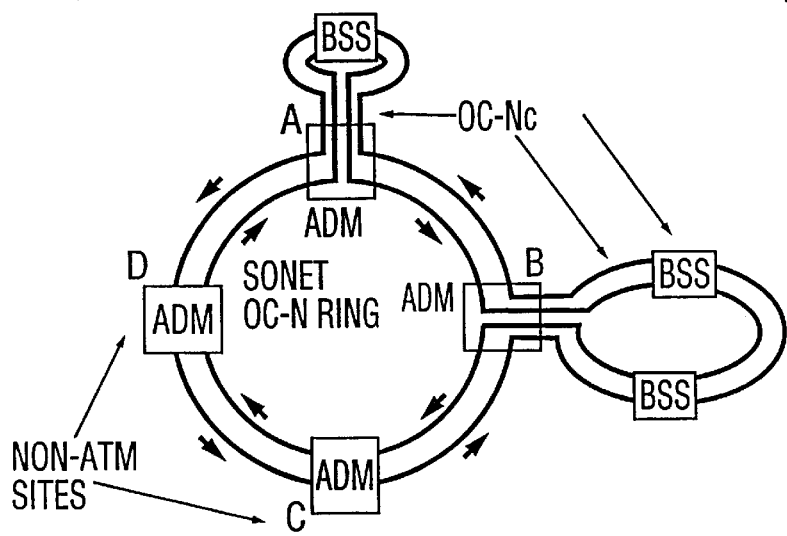
FIG. 8 shows a SONET-ATM ring overlay.

FIG. 8 shows how an ATM ring can be overlaid on a SONET ring. This is important because ATM interfaces become increasingly difficult to design at the higher SONET rates. Interfaces at OC-12c are feasible and cost effective; however cell processing at the next step common step in the hierarchy, OC-48c, becomes extremely difficult to deal with. IN FIG. 8, For example, an OC-12c ATM ring is overlaid on an OC-48 SONET ring. BSS is an ATM ring with ATM VP functionality as per Bellcore GR-2837-CORE.

There will be demands to handle aggregate bandwidth of much greater than that offered by OC-12c interfaces. This can be achieved by running multiple OC-12c ATM rings overlaid on simple OC-48 or OC-192 SONET rings.

The described architecture provides good fault protection while minimizing wasted available bandwidth.

Although preferred embodiments of the invention have been illustrated in the accompanying drawings and described in the foregoing detailed description, it will be understood that the invention is not limited to the embodiments discloses, but is capable of numerous rearrangements, modifications and substitutions of parts and elements without departing from the spirit of the invention which is defined in the following claims.

What is claimed is:

1. A communications network comprising:
   a plurality of nodes interconnected in a ring architecture;
   a pair of counter-rotating packet-based rings interconnecting said nodes to establish virtual connections therebetween; and
   each of said nodes including a ring interface and a packet switch connected thereto, said ring interface comprising means for extracting packets from either of said rings destined therefore and passing them to the packet switch, means for adding outgoing packets from the packet switch to either of said rings, and means for passing packets directly through on each of said rings not destined for that node, whereby a virtual mesh structure is established between said nodes, and wherein each of said nodes can be configured either:
   a) to transmit packets on both said rings, in which case
      (i) in the absence of a fault each of said nodes is configured to select one of said rings from which to receive packets,
      (ii) if only one of the said rings has a fault, each of said nodes is configured to select an other of said rings which is free of faults from which to receive packets, and
      (iii) if both said rings have faults, each of said nodes is configured to select both said rings from which to receive packets; or
   b) to receive packets from both said rings, in which case
      (i) in the absence of a fault, each of said nodes is configured to select one of said rings on which to transmit packets dependent on the destination of the transmitted packets, and
      (ii) in the presence of a fault each of said nodes is configured to alter its transmitting behaviour to broadcast packets on both said rings.

2. The network as claimed in claim 1, wherein said rings are unidirectional and each of said nodes is configured to transmit packets on both said rings.

3. The network as claimed in claim 1, wherein said rings are bi-directional and each of said nodes configured to receive packets from both said rings.

4. The network as claimed in claim 1, wherein said network is an ATM network and said packets are ATM cells.

5. The network as claimed in claim 4, wherein said ATM network is overlaid onto a time division multiplexed network.

6. The network as claimed in claim 5, wherein said time division multiplexed network is a SONET network.

7. A method of establishing communication over a network comprising:
   interconnecting a plurality of nodes in a ring architecture;
   setting up virtual connections on a pair of counter-rotating packet-based rings to interconnect said nodes; and
   at each of said nodes extracting packets from said rings destined for that node, adding outgoing packets from that node to said rings, and directly passing through packets on each of said rings not destined for that node, whereby a virtual mesh structure is established between said nodes, and wherein either.
   a) each of said nodes transmits packets on both said rings, in which case
      (i) in the absence of a fault each of said nodes selects one of the rings from which to receive packets,
      (ii) if only one of said rings has a fault, each of said nodes selects the other of said rings that is fault-free from which to receive packets, and
      (iii) if both said rings have faults, each of said nodes selects both said rings from which to receive packets; or
   b) each said of said nodes receives packets from both said rings, in which case
      (i) in the absence of a fault, each of said nodes selects one of said rings on which to transit packets dependent on the destination of the transmitted packets, and
      (ii) in the presence of a fault peach of said nodes alters its transmitting behavior to broadcast packets on both said rings.

8. The method as claimed in claim 7, wherein said rings are unidirectional and each of said nodes transmits packets on both said rings.

9. The method as claimed in claim 7, wherein said rings are bi-directional.

10. The method as claim 7, wherein said network is an ATM network and said packets are ATM cells.

11. The method as claimed in claim 10, wherein said ATM network is overlaid onto a time division multiplexed network.

12. The method as claimed in claim 11, wherein said time division multiplexed a network is a SONET network.

13. The method as claimed in claim 10, wherein fault information is carried between nodes by in-band ATM cells.

14. The method as claimed in claim 7, wherein said rings are unidirectional and each of said nodes transmits packets on both said rings.

15. The method as claimed in claim 7, wherein said rings are bi-directional and each of said nodes receives packets from both said rings.

* * * * *